United States Patent [19]
Keener et al.

[11] Patent Number: 5,033,049
[45] Date of Patent: Jul. 16, 1991

[54] ON-BOARD DIAGNOSTIC SUB-SYSTEM FOR SCSI INTERFACE

[75] Inventors: Don S. Keener, Boca Raton; Andrew B. McNeill; Kevin L. Scheiern, both of Deerfield Beach, all of Fla.

[73] Assignee: International Business Machines Corporation, Armonk, N.Y.

[21] Appl. No.: 364,363

[22] Filed: Jun. 12, 1989

[51] Int. Cl.$^5$ .......................................... G06F 11/00
[52] U.S. Cl. .................................. 371/23; 364/200; 371/16.1
[58] Field of Search ...................... 371/16.1, 16.2, 23; 364/200 MS File, 900 MS File

[56] References Cited

U.S. PATENT DOCUMENTS

| | | | |
|---|---|---|---|
| 3,889,109 | 6/1975 | Blessin | 235/153 AK |
| 3,931,506 | 1/1976 | Borrelli | 235/153 AC |
| 3,958,111 | 5/1976 | Hackett | 235/153 AK |
| 4,275,464 | 6/1981 | Schmidt | 371/15 |
| 4,339,819 | 7/1982 | Jacobson | 371/16 |
| 4,385,349 | 5/1983 | Ashford | 364/184 |
| 4,499,580 | 2/1985 | Takahashi | 371/17 |
| 4,500,993 | 2/1985 | Jacobson | 371/16 |
| 4,535,456 | 8/1985 | Bauer | 371/16 |
| 4,638,455 | 1/1987 | Yamazaki | 364/900 |
| 4,669,004 | 5/1987 | Moon | 360/77 |
| 4,718,064 | 1/1988 | Edwards | 371/20 |
| 4,779,196 | 10/1988 | Manga | 364/200 |
| 4,783,705 | 11/1988 | Moon | 360/77 |
| 4,868,825 | 9/1989 | Koeppe | 371/23 |
| 4,905,184 | 2/1990 | Giridhar et al. | 364/900 |
| 4,914,656 | 4/1990 | Dunphy, Jr. et al. | 371/10.2 |

OTHER PUBLICATIONS

Aseo, "Disk Interfacing Gets Smart", *ESD*, Nov. 1987, pp. 77–84.
Ow-Wing, "Diagnostic Registers Simplify System Self-Testing", *Electronic Design*, Oct. 27, 1983, pp. 155–164.
Ow-Wing, "Strategy for Diagnostic Design", *New Electronics*, Oct. 18, 1983, pp. 74–77.
Robinson, "SCSI Interface Demands New Test Methods", *Mini-Micro Systems*, Apr. 1988, pp. 35–39.
Squires, "Outsmarting Smart Interfaces to Test Winchester Drives", *Electronics Test*, Feb. 1988, pp. 39–43.
"Solving the Test Problem in SCSI Disk Drives", *Electronics*, Feb. 17, 1986, pp. 35–37.
"Western Digital Slashes SCSI Bus Overhead Time", *Electronics*, Aug. 20, 1987, pp. 64–65.

*Primary Examiner*—Charles E. Atkinson
*Attorney, Agent, or Firm*—Pollock, Vande Sande & Priddy

[57] ABSTRACT

On board diagnostic capability for a SCSI controller is provided within an adapter by providing a gate array driven by a microprocessor on board the adapter. The gate array has data and control inputs driven from the microprocessor and data and control outputs which are dot OR'ed with corresponding in/out terminals of the SCSI controller. A reset signal from a SCSI bus forms a further input to the gate array. For testing purposes the microprocessor drives the gate array inputs to simulate a fault-free or faulty device. The microprocessor detects the response of the SCSI controller to the device simulation and thereby can determine the state of health of the SCSI controller.

9 Claims, 3 Drawing Sheets

ON-BOARD DIAGNOSTIC SUB-SYSTEM FOR SCSI INTERFACE

FIELD OF THE INVENTION

The invention relates to testing devices complying with the Small Computer System Interface (SCSI) and more particularly to a system with on board testing and diagnostic capability for devices such as a SCSI controller.

BACKGROUND OF THE INVENTION

Diagnostic subsystems have, in the past, been applied in at least two different applications. In one application, diagnostic systems and sub-systems have been used as a part of the manufacturing process. More particularly, after a product is manufactured it is connected to a diagnostic system or sub-system to insure that the manufactured device meets manufacturing specifications and is in condition for sale. In an entirely different application, diagnostic sub-systems have been included as part of computer systems. Typically such an on board diagnostic sub-system is initiated into operation as part of Power On Reset (POR) sequence each time the computer system is powered up or reset. The diagnostic sub-system performs a routine of tests and either allows normal processing to be initiated if the tests are successfully passed or reports some information about any tests which are not successfully completed.

One problem faced by the diagnostic sub-system designer is typified by the expandable nature of the Personal Computer (PC). More particularly the nature and complement of devices included in the computer system cannot be predicted. This unpredictability limits the extent and nature of the diagnostics. Prior art I/O devices, for example hard files, are associated with a device controller, and the device controller is usually tested with the device connected to the controller. Prior art ST506 and Enhanced Small Device Interface (ESDI) devices are examples of this architecture.

More recently, with the advent of the SCSI standard, logic which is dedicated to operation of devices such as a hard file has been moved from the controller to the hard file assembly itself. This leaves a generic interface which actually operates as a low cost network and is capable of supporting hard files, diskette drives, CD ROM drives, printers etc. This new architecture requires a completely different method of testing the SCSI controller from those used in the ST506 and ESDI arrangements. See in this regard, "Solving the Test Problem in SCSI Disk Drives" appearing in *Electronics*, page 35 at seq., Feb. 17, 1986; Robinson, "SCSI Interface Demands New Test Methods", *Mini-Micro Systems*, page 35, April, 1988; Squires, "Outsmarting Smart Interfaces to Test Winchester Drives", *Electronics Test*, February, 1988; "Western Digital Slashes SCSI Bus Overhead Time" in *Electronics*, Aug. 20, 1987 and Aseo, "Disc Interfacing Gets Smart", *ESD: The Electronics System Design Magazine*, page 77, November 1987.

The SCSI or generic interface raises a number of testing issues especially with respect to the SCSI interface between a system, such as a Personal Computer system, and a plurality of devices coupled to the SCSI interface through a SCSI bus. Although in prior devices the hardware between a system and a peripherial device was identified as a controller this application will refer to the hardware interfacing the computer system and the SCSI devices as a SCSI adapter. Thus the SCSI adapter has a port coupled to a first bus which first bus is coupled to a port of the computer system. The SCSI adapter has a second port which is coupled to the SCSI bus and via that bus to one or more SCSI devices. Typically the SCSI adapter includes a SCSI controller as a component.

One problem raised by the SCSI interface is caused by the inability to assume a particular configuration of devices connected on the SCSI bus. Because no configuration can be assumed, it is not possible to select specific test procedures, for execution, based on the configuration. For example one configuration may require a collection of printers, another configuration may include a collection of read only CD ROMS, another configuration may have a plurality of read/write hard files, a different configuration may have all of the above and finally a further configuration may include devices still being developed. The inability to assume a particular device configuration, coupled with the limitations a particular device may provide in testing many of the modes of operation requires a new and effective test capability which is effectively independent of the devices connected on the SCSI bus.

A second problem is the necessity to isolate defects in the drivers and receivers in the SCSI adapter or more particularly, the SCSI controller contained in the adapter. Often if the drivers and receivers are defective, the defects cannot be isolated between the adapter, the cable or the device.

A third problem is the testing environment. The test sub-system may operate in an environment in which it is not the autonomous bus master, this is particularly true of the SCSI environment. While in the SCSI environment the adapter usually has the highest priority, nevertheless other devices may attain control of the bus and that condition must be respected; furthermore there may be more than a single adapter on the bus. As a result the diagnostic sub-system must take into account the presence of other devices which may be connected on the bus. If the diagnostic sub-system assumes control of the SCSI bus, it is conceivable that it can interfere with the operation of other bus users to the detriment of the entire system.

SUMMARY OF THE INVENTION

The invention solves the foregoing problems and provides an advance in the art as follows. In one form of the invention, the SCSI controller, component of the SCSI adapter, is coupled to the SCSI bus and more particularly to eight data conductors, a data parity conductor, a C/D (commands/data) conductor, a MSG (message) conductor, a I/O (input/output) conductor, a SEL (select) conductor, a BSY (busy) conductor, a REQ (request) conductor, an ACK (acknowledge) conductor, and a RST (reset) conductor. Dot OR'ed to the C/D, I/O, MSG, SEL, BSY, REQ, ACK and parity conductors of the SCSI controller are the outputs of a diagnostic gate array. The gate array has eight data output conductors which are dot OR'ed with the eight data conductors coupled to the SCSI controller data I/O terminals. The outputs of the gate array are derived from a plurality of registers contained in the diagnostic gate array. Inputs to the diagnostic gate array are provided by a dedicated micro-processor, dedicated to the adapter. The micro-processor output which is coupled to the diagnostic gate array includes eight data bits, write select control signals and a wrap (test) control signal. A further input to the diagnostic gate array is a signal appearing on the RST conductor of the SCSI bus.

With the capability afforded by the diagnostic gate array, the SCSI controller can be exercised by diagnostic microcode and the outputs of the diagnostic gate array, also driven by the micro-processor can simulate the response of an attached device operating either in a fault-free or purposefully simulated fault mode, and generally in both modes. Diagnostic microcode which exercises the SCSI controller causes the SCSI controller to select itself thereby eliminating the possibility of corrupting the integrity of devices connected to the SCSI bus. Diagnostic microcode, coupled through the diagnostic gate array simulates a SCSI device attached to the SCSI bus to thereby test the arbitration, selection, re-selection and read/write functions of the SCSI controller. Testing can put the SCSI controller in both an initiator and target modes using DMA and automatic PIO methods where appropriate. The diagnostic microcode can also implement phase and parity testing.

The testing can be implemented with or without the SCSI bus connected to the SCSI connector on the adapter, so long as the connector is properly terminated. Because the input/output terminals of the SCSI controller are dot OR'ed to outputs of the diagnostic gate array, the presence of a SCSI bus and/or the presence of devices connected to the SCSI bus is completely immaterial to the diagnostic operation (again assuming proper termination to prevent signal reflections).

Accordingly, in one aspect the invention provides device adapter capable of controlling a variety of peripheral devices each designed to comply with a Small Computer System Interface (SCSI) standard, said device adapter including:

a connector for connection to a SCSI bus;

a micro-processor and dedicated memory coupled thereto;

a SCSI device controller coupled to and driven by said micro-processor, said SCSI device controller including dedicated input/output terminals for driving selected conductors of said SCSI bus and for responding to selected conductors of said SCSI bus, and a gate array with a set of inputs coupled to said micro-processor and a set of outputs coupled in common with said input/output terminals of said SCSI device controller.

It should be apparent from the foregoing that the diagnostic gate array, in combination with other elements of the SCSI adapter, allows diagnostic operations either in the manufacturing process or as part of a POR sequence.

In the form of the invention already described the diagnostic gate array and the SCSI controller may be implemented as separate electronic chips. However in another (or second) form of the invention the diagnostic gate array can be integrated with the SCSI controller to form a single electronic chip. This single electronic chip, in accordance with the second form of the invention, may include the functions attributed to the SCSI controller and the functions attributed to the diagnostic gate array in accordance with the description of the first form of the invention.

BRIEF DESCRIPTION OF THE DRAWINGS

The invention will be further described in the following portions of this specification when taken in conjunction with the attached drawings in which.

DETAILED DESCRIPTION OF PREFERRED EMBODIMENTS

Figure 1:
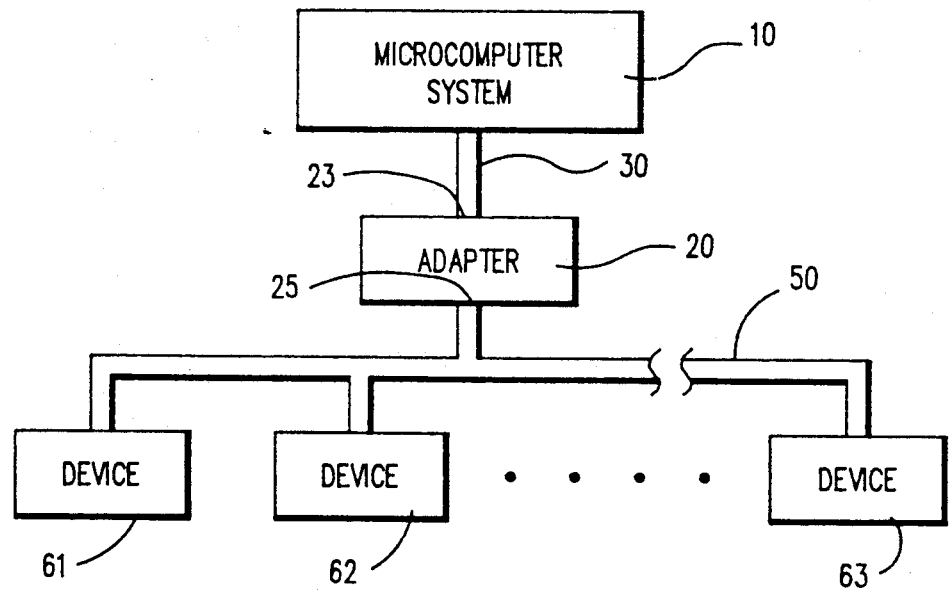
FIG. 1 is a block diagram of a micro computer system including an adapter 20 its associated interface and a plurality of devices coupled to that interface.
Figure 2:
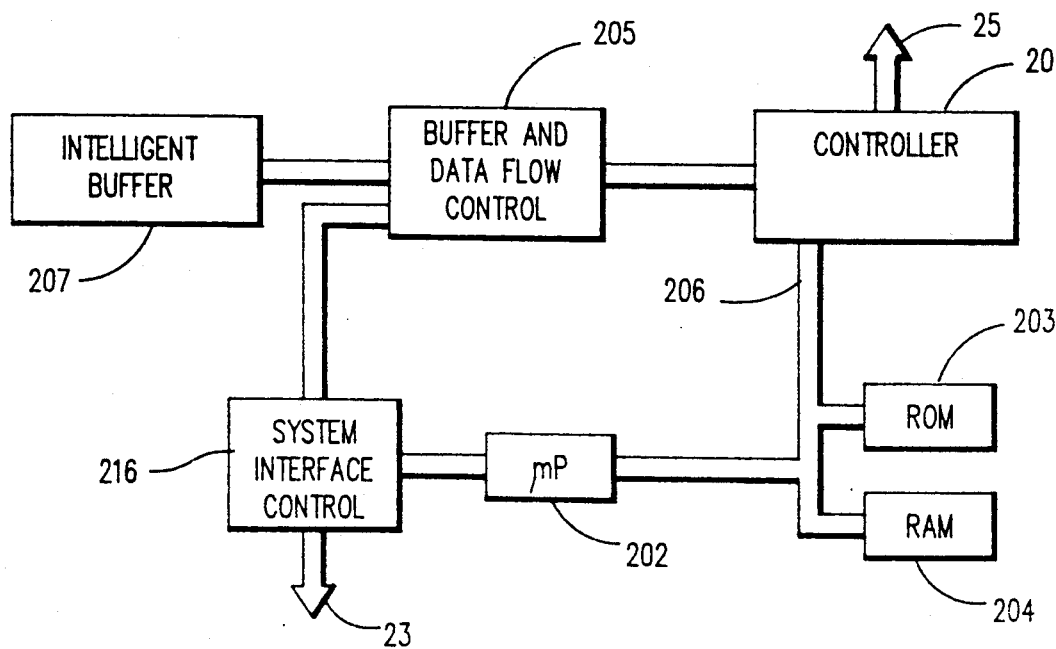
FIG. 2 is a detailed block diagram of the adapter 20.
Figure 3:
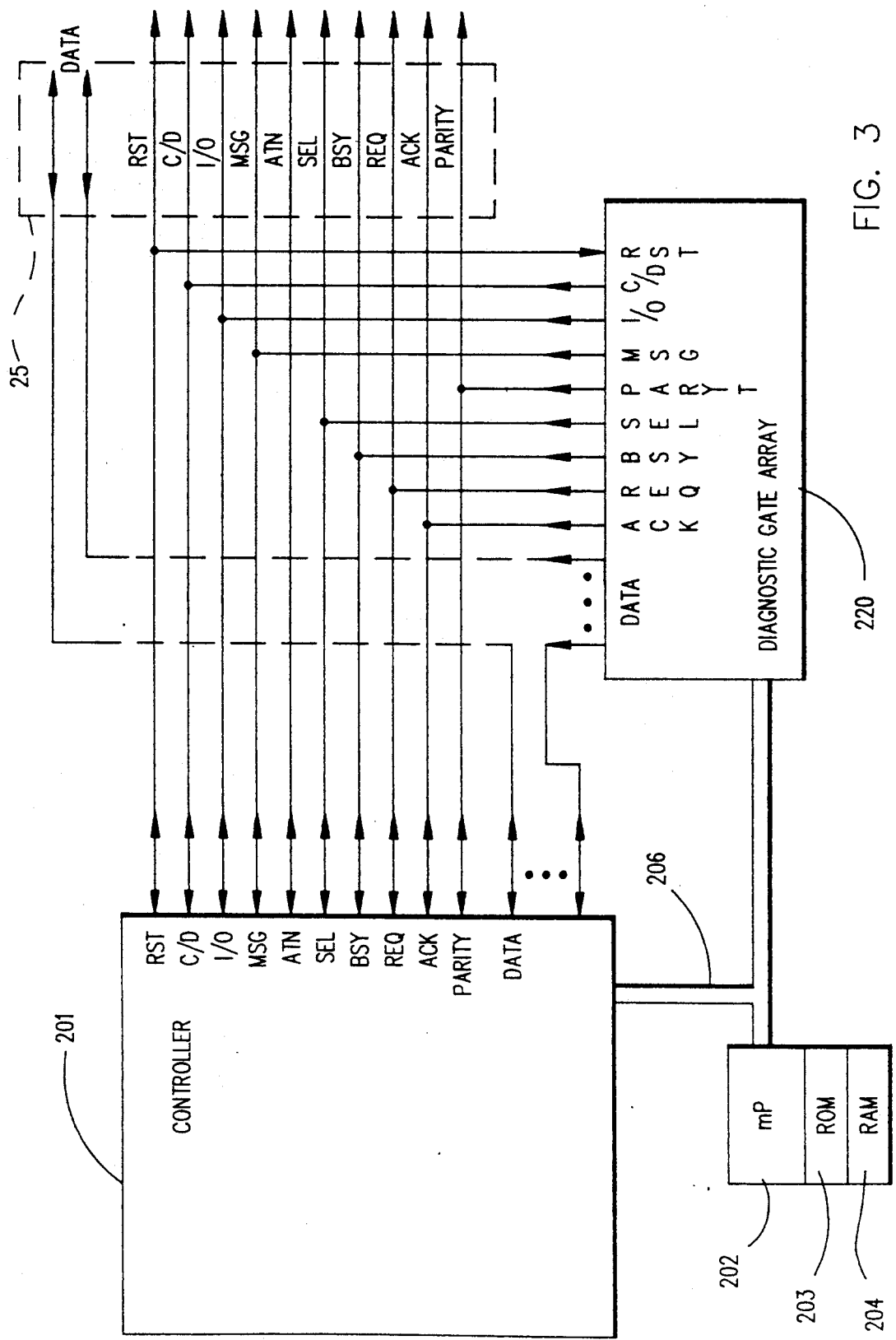
FIG. 3 is a further detail of the adapter 20 showing a typical SCSI controller 201 and a diagnostic gate array 220, in accordance with the present invention.

FIG. 1 is a block diagram of a typical microcomputer system 10 showing, in detail, an adapter 20 coupled to and controlling a plurality of devices 61-63 through a bus 50. The bus 50 is coupled to a port 25 on the adapter. In addition, the adapter 20 includes a port 23 through which the adapter is coupled to the bus 30. In a specific embodiment of the invention the adapter 20 comprises a SCSI adapter e.g., an adapter conforming to the SCSI standard. The adapter 20 has a port 25 coupled to a SCSI bus 50 which in turn connects each to a plurality of devices 61-63. Devices 61-63 can be any of a variety of peripheral devices conforming to the SCSI standard such as hard files, floppy disc drives, printers, CD ROMs, etc. As will be more completely described below the SCSI adapter 20 includes a diagnostic subsystem which allows the adapter 20 to test a SCSI controller included within the adapter 20. FIG. 2 is a block diagram of the adapter 20 showing several of the components therein including a peripheral device controller 201 which can, for example, be a SCSI controller. The controller 201 is coupled through the port 25 to the SCSI bus 50. The controller also, is coupled over a bus 206 to a dedicated micro-processor 202 (such as the Intel 80188) and to ROM 203 and RAM 204. The micro-processor 202 is coupled to a Buffer & Data Flow Control element 205 and to a System Interface Control 206. The System Interface Control 206 is coupled via the port 23 to the bus 30. The adapter 20 also includes an intelligent buffer 207 coupled to the SCSI controller 201 through the Buffer & Data Flow Control element 205. FIG. 2 does not show the diagnostic sub-system which can be incorporated as is shown in FIG. 3. FIG. 3 shows the bus 206 coupling the micro-processor 202 to the SCSI controller 201 and the relationship of the micro-processor 202 to the ROM 203 and RAM 204. FIG. 3 shows in detail a plurality of input/output terminals of the SCSI controller 201. Input/output terminals include reset (RST), command/data (C/D), input/output (I/O), message (MSG), attention (ATN), select (SEL), busy (BSY), request (REQ), acknowledge (ACK), and parity terminals. Each of these terminals is connected via a dedicated conductor to a corresponding terminal in the port or connector 25 through which these terminals are connected to the SCSI bus 50. In addition, the SCSI controller 201 includes eight data input/output terminal each of which is connected to a different conductor and therethrough to a corresponding terminal in the connector or port 25.

FIG. 3 also shows the diagnostic gate array 220. The diagnostic gate array 220 includes an input from the bus 206, coupling signals generated from the dedicated micro-processor 202. The diagnostic gate array includes an output terminal for each of eight data conductors, as well as for each of the following: ACK, REQ, BSY, SEL, PARITY, MSG, I/O, and C/D. Conductors from each of these output terminals are connected to the corresponding conductor coupled between a like input-/output terminal of the SCSI controller 201 and the port or connector 25. The diagnostic gate array 220 also includes a further input terminal RST which is connected to the conductor coupling the SCSI controller terminal RST to the port or connector 25.

Figure 4:
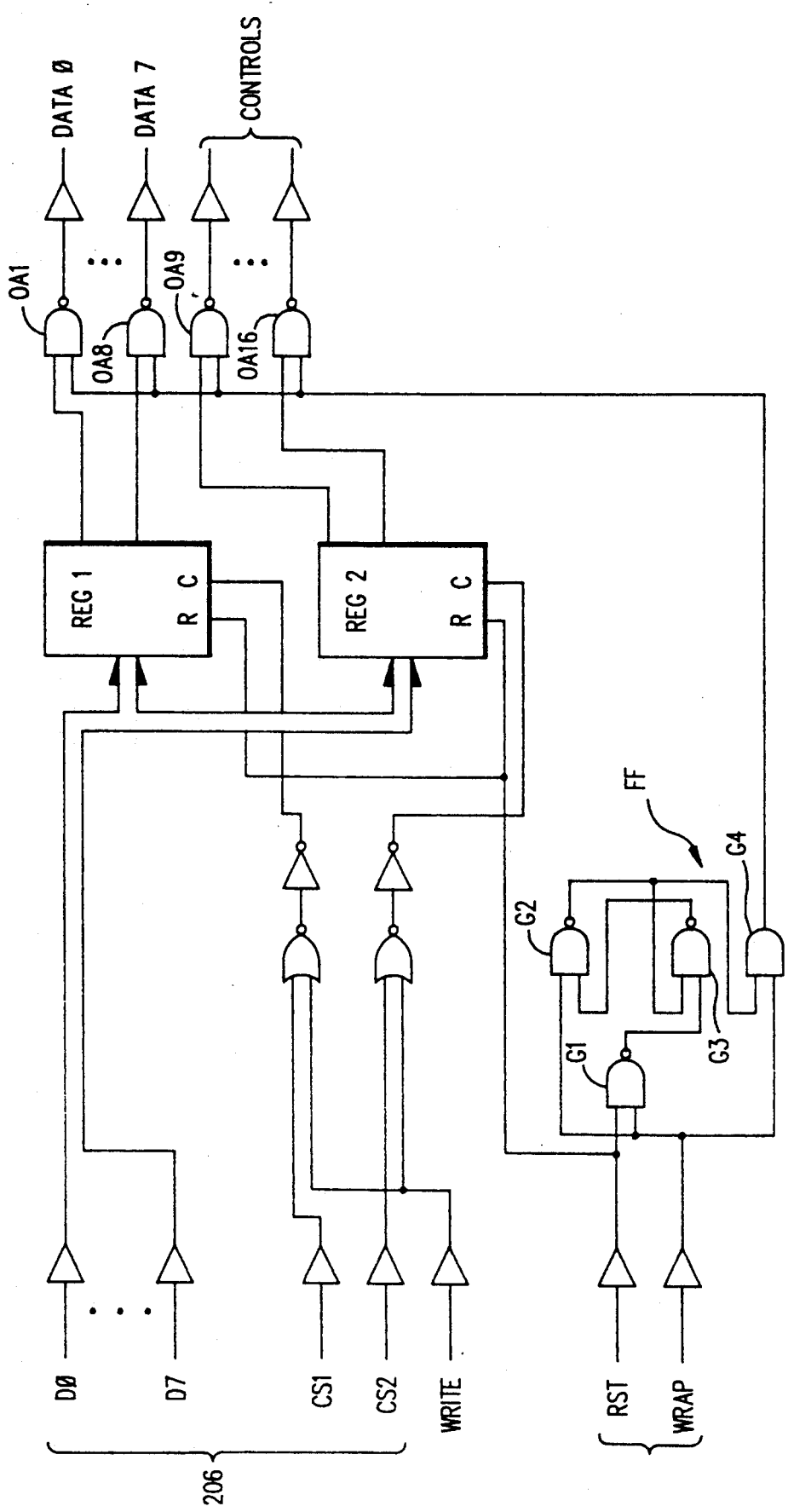
FIG. 4 is a schematic of the diagnostic gate array 220.

FIG. 4 is a block diagram of one preferred embodiment of the diagnostic gate array 220 of FIG. 3. More particularly, as shown in FIG. 4 the bus 206 provides 12 input signals to the diagnostic gate array 220. These signals include eight bits of data D0–D7, two register select signals, CS1 and CS2, a Write control signal and a WRAP control signal. The thirteenth input to the diagnostic gate array 220 is provided at the RST terminal which is coupled to the RST terminal at port 25 and to the RST terminal of the SCI controller 201.

The gate array 220 includes two registers, REG1 and REG2. Each of the registers has eight data input terminals, each coupled to one of the input terminals D0–D7. Two additional inputs to the gate array 220 are the control signals CS1 and CS2. The presence of either CS1 or CS2 selects the associated element either REG1 or REG2 for writing the contents of D0–D7. The information is written in the joint presence of the appropriate select signal (CS1 or CS2) along with the Write signal, another input from the bus 206.

Each of the registers, REG1 and REG2, has each of its eight output terminals connected to a different one of a plurality of output gates OA1–OA16. The other input terminal to each of the gates OA1–OA16 is provided by the output of a gate G4 which is one element of a bistable element or flip-flop FF formed by gates G1–G4. The two inputs to the flip-flop FF are the RST signal and the WRAP signal. Assuming that RST is absent (or inactive) then assertion of WRAP partially enables each of the gates OA1–OA16 to repeat, at its output, the other input provided from the associated terminal of one of the registers REG1–REG2. Eight of the outputs of the gate array 220 are the signals DATA0–DATA7 which, as shown in FIG. 3 are dot OR'ed with the signals provided by the DATA terminals of the SCI controller 201. The other eight outputs of the gate array 220 are the control signals ACK, REQ, BSY, SEL, PARITY, MSG, I/O and C/D.

From the foregoing it should be apparent that the micro-processor 202 can, by providing the appropriate signals over the bus 206, drive any of the 16 output terminals of the gate array 220 in any desired sequence or pattern. More particularly, the data stored in any stage of either of the registers REG1 or REG2 is controlled by transmitting the appropriate bit on that one of the conductors, D0–D7 associated with the selected stage of the register, and asserting either CS1 or CS2 depending on which of the registers the stage appears in, along with the Write signal. Once the registers REG1 and REG2 have been loaded with the appropriate data, assertion of WRAP will produce the corresponding data at the output of the gate array 220.

The RST input, since it is connected via the port 25 to the RST conductor on the SCSI bus, will follow the state of the RST conductor on the SCSI bus.

Accordingly, even if the gate array 220 is being driven by the micro-processor 202, the presence of the reset signal on the RST bus will be detected by the gate array 220, that detection will cause the state of the flip-flop FF to change. The change in state of the flip-flop FF will disable each of the gates OA1–OA16. Accordingly, the gate array 220 will respond to the reset signal on the SCSI bus as any other SCSI device is required to respond by the standard.

In order to test the SCSI controller 201 the micro-processor 202 (driven by a micro-code) from either ROM203 or RAM204, first commands the SCSI controller 201 to arbitrate for control of the SCSI bus. This ensures that testing of the SCSI controller 201 will not interfere with any other transactions which may be simultaneously taking place across the SCSI bus. On successfully arbitrating for control of the bus, the SCSI controller 201 then proceeds to select itself, e.g. it identifies the target device as the device with its own ID. The micro-processor 202 then drives the gate array 220 with a sequence of signals. Those signals can simulate the normal response of any target device to the SCSI controller 201. The micro-processor 202 then monitors the status of the SCSI controller 201 to ensure that the SCSI controller 201 properly responds to the simulated response generated by the gate array 220. In addition, or in lieu of the foregoing the micro-processor 202 can drive the gate array 220 with a simulation of an error condition (PARITY overrun, etc.) and also monitor the response of the SCSI controller 201. In this fashion the SCSI controller may be tested whether or not any device is connected to the SCSI bus (so long as the bus is properly terminated) and if a device is so connected regardless of its identity or characteristics. Furthermore, by controlling the pattern of signals written to the gate array 220 the response of the SCSI controller 201 to fault-free or faulty devices can be detected by the micro-processor 202.

Although not illustrated, in the second form of the invention, the gates and registers of FIG. 4 are integrated into the structure of the SCSI controller 201. As a result the dot OR'ed connections of FIG. 3 are no longer external to the SCSI controller but rather are, in the second form of the invention, internal to the SCSI controller 201. In other respects the two forms of the invention have similar operational characteristics.

It should be therefore apparent that many other and further changes can be made within the spirit and scope of the present invention. The present invention is not to be limited by the examples described herein but is to be construed in accordance with the claims attached hereto.

We claim:

1. A device adapter capable of controlling a variety of peripheral devices each designed to comply with a specific standard, said device adapter including:
   a connector for connection to a multiconductor bus;
   a micro-processor and dedicated memory coupled thereto;
   a device controller coupled to and driven by said micro-processor, said device controller including dedicated input/output terminals for driving selected conductors of said multiconductor bus and for responding to selected conductors of said multiconductor bus, and
   a gate array with a set of inputs coupled to said micro-processor and a set of outputs coupled in common with said input/output terminals of said device controller.

2. A device adapter as recited in claim 1 wherein said specific standard is a Small Computer System Interface standard and wherein said gate array includes a Reset input coupled to said multiconductor cable.

3. A device adapter capable of controlling a variety of peripheral devices each designed to comply with a Small Computer System Interface (SCSI) standard, said device adapter including:
- a connector for connection to a SCSI bus;
- a micro-processor and dedicated memory coupled thereto;
- a SCSI device controller coupled to and driven by said micro-processor, said SCSI device controller including dedicated input/output terminals for driving selected conductors of said SCSI bus and for responding to selected conductors of said SCSI bus, and
- a gate array with a set of inputs coupled to said micro-processor and a set of outputs coupled in common with said input/output terminals of said SCSI device controller.

4. A diagnostic subsystem for use with a Small Computer System Interface (SCSI) adapter where said Small Computer System Interface (SCSI) adapter includes a micro-processor and dedicated memory coupled thereto, and a SCSI controller coupled to said micro-processor and to a SCSI bus, said diagnostic subsystem including:
- a gate array coupled, to said micro-processor and to said SCSI controller and, also coupled to said SCSI bus,
- said subsystem further including:
- means responsive to a diagnostic command received at said SCSI controller for selecting said SCSI controller and for generating and coupling, through said gate array, signals simulating a response of an attached device.

5. A diagnostic subsystem as recited in claim 4 wherein said means responsive to a diagnostic command for generating signals simulating an attached device includes means for simulating a fault free attached device.

6. A diagnostic subsystem as recited in claim 4 wherein said means responsive to a diagnostic command for generating signals simulating an attached device includes means for simulating a faulty attached device.

7. A diagnostic subsystem as recited in claim 4 wherein said gate array includes a plurality of register stages, each coupled to an input terminal of said gate array, first logic means responsive to command signals for enabling at least one of said register stages to store information representative of a signal appearing at said input terminal, and second logic means for coupling information stored in said at least one register stage to an output terminal.

8. A diagnostic subsystem as recited in claim 7 wherein said second logic means includes:
- a reset input terminal coupled to a reset signal carrying conductor included in said SCSI bus, and means responsive to an active reset signal for disabling said second logic means from coupling information to said output terminal.

9. A diagnostic subsystem as recited in claim 8 wherein said second logic means includes a wrap test input terminal, and means responsive to a transition of said wrap test signal for enabling said second logic means.

* * * * *

UNITED STATES PATENT AND TRADEMARK OFFICE
CERTIFICATE OF CORRECTION

PATENT NO. : 5,033,049
DATED : July 16, 1991
INVENTOR(S) : Keener et al

It is certified that error appears in the above-identified patent and that said Letters Patent is hereby corrected as shown below:

Col. 1, line 52, "at" should be -et-;

line 66, "peripherial" should be -peripheral-.

Col. 3, line 20, "an" should be deleted.

Col. 4, line 62, "terminal" should be -terminals-.

Signed and Sealed this

Twenty-fourth Day of November, 1992

Attest:

DOUGLAS B. COMER

*Attesting Officer*     *Acting Commissioner of Patents and Trademarks*